US007009125B1

(12) United States Patent
Hernandez-Zelaya

(10) Patent No.: US 7,009,125 B1
(45) Date of Patent: Mar. 7, 2006

(54) ELECTRICAL FLUID ACTIVATED SWITCH

(76) Inventor: Rodolfo Hernandez-Zelaya, 4217 E. 98 Ave., Tampa, FL (US) 33617-4432

( * ) Notice: Subject to any disclaimer, the term of this patent is extended or adjusted under 35 U.S.C. 154(b) by 427 days.

(21) Appl. No.: 10/447,054

(22) Filed: May 28, 2003

Related U.S. Application Data

(63) Continuation-in-part of application No. 10/224,811, filed on Aug. 21, 2002, now abandoned.

(51) Int. Cl.
*F28B 9/08* (2006.01)
(52) U.S. Cl. .............. 200/84 C; 62/150; 340/616; 340/624; 73/308; 73/319; 285/143.1
(58) Field of Classification Search ............ 62/150; 340/616, 624; 222/67; 73/308, 319; 200/84 C; 285/143.1
See application file for complete search history.

(56) References Cited

U.S. PATENT DOCUMENTS

| 303,656 | A | * | 8/1884 | Metzger et al. .......... 285/143.1 |
| 4,633,673 | A | * | 1/1987 | Morrison et al. ............. 62/129 |
| 4,893,846 | A | * | 1/1990 | McGraw ................... 285/133.4 |
| 6,161,876 | A | * | 12/2000 | Sabathie ....................... 285/39 |
| 6,442,955 | B1 | * | 9/2002 | Oakner et al. ................ 62/150 |

* cited by examiner

*Primary Examiner*—Terry K. Cecil
(74) *Attorney, Agent, or Firm*—Edward P. Dutkiewicz

(57) ABSTRACT

A linear slip to slip coupling has an input portion and an output portion with a common horizontal centerline. A fluid container has a threaded aperture. An adaptor has a threaded input end releasably coupled to the threaded aperture of the container. An unthreaded output end is coupled to the input portion. A nipple has an output end and an input end. The nipple is coupled to the output portion of the coupling. An end cap is coupled to the output end of the nipple. An induction switch subassembly is coupled to the coupling.

3 Claims, 2 Drawing Sheets

ELECTRICAL FLUID ACTIVATED SWITCH

RELATED APPLICATION

The present application is a continuation in part application of U.S. patent application Ser. No. 10/224,811, filed on Aug. 21, 2002 now abandoned the subject matter of which is incorporated herein by reference.

BACKGROUND OF THE INVENTION

1. Field of the Invention

The present invention relates to an improved electrical fluid activated switch and more particularly pertains to allowing a user to safely and conveniently control a fluid level of a container.

2. Description of the Prior Art

The use of fluid level controllers of known designs and configurations is known in the prior art. More specifically, fluid level controllers of known designs and configurations previously devised and utilized for the purpose of controlling fluid levels are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,893,846 issued Jan. 16, 1990, to McGraw discloses connector fittings. U.S. Pat. No. 6,161,876 issued Dec. 19, 2000, to Sabathie discloses an elbow connection for tubular manifold for a motor vehicle air-conditioning system. U.S. Pat. No. 6,329,493 issued Dec. 11, 2001, to El Hibri et al. discloses plumbing articles from poly (aryl ether sulfones). U.S. Pat. No. 303,656 issued Aug. 19, 1884, to Metzger et al. discloses a faucet coupling. Lastly, U.S. Pat. No. 4,633,673 issued Jan. 6, 1987, to Morrison et al. discloses an emergency shutoff for air conditioners.

While these devices fulfill their respective, particular objectives and requirements, the aforementioned patents do not describe an improved electrical fluid activated switch that allows allowing a user to safely and conveniently control a fluid level of a container.

In this respect, the improved electrical fluid activated switch according to the present invention substantially departs from the conventional concepts and designs of the prior art, and in doing so provides an apparatus primarily developed for the purpose of allowing a user to safely and conveniently control a fluid level of a container.

Therefore, it can be appreciated that there exists a continuing need for a new and improved electrical fluid activated switch which can be used for allowing a user to safely and conveniently control a fluid level of a container. In this regard, the present invention substantially fulfills this and other needs.

SUMMARY OF THE INVENTION

In view of the foregoing disadvantages inherent in the known types of fluid level controllers of known designs and configurations now present in the prior art, the present invention provides an improved electrical fluid activated switch. As such, the general purpose of the present invention, which will be described subsequently in greater detail, is to provide a new and improved electrical fluid activated switch and method which has all the advantages of the prior art and none of the disadvantages.

To attain this, the present invention essentially comprises a linear slip to slip coupling. The coupling is fabricated of rigid material. The rigid material is preferably a plastic such as polyvinyl chloride. The coupling has an input portion and a output portion. The input portion has a round tubular configuration. The input portion has an input opening. The input portion has a horizontal central axis and a first diameter. The output portion has a round tubular configuration. The output portion has an output opening. The output portion has a horizontal central axis and a second diameter. The axis of the input portion and the axis of the output portion are coextensive. The axis of the input portion and the axis of the output portion are coextensive and are on a common horizontal line.

A fluid container is provided. The fluid container has a vertical wall. The vertical wall holds fluid generated by an air conditioner. A threaded aperture extends through the vertical wall.

A threaded male slip adaptor is provided next. The slip adaptor is fabricated of rigid material. The rigid material is preferably a plastic such as polyvinyl chloride. The adaptor has a threaded input end. The input end is releasably coupled to the threaded aperture of the container. The adaptor has an unthreaded output end. The output end is coupled to the input opening of the coupling. In this manner fluid is allowed to flow into the coupling in the range of a desired fluid level.

A cylindrical unthreaded nipple is provided. The nipple is fabricated of rigid material. The rigid material is preferably a plastic such as polyvinyl chloride. The nipple has an input end. The input end is coupled to the output opening of the coupling. The nipple has an output end.

An end cap is also provided. The end cap is fabricated of a rigid transparent material. The rigid material is preferably a plastic such as polycarbonate and acrylic. The end cap is coupled to the output end of the nipple. The end cap seals the output portion of the coupling and the output end of the nipple. The transparent material allows the user to see the level of water therein which is the water level of the container.

Further provided is an induction switch subassembly. The subassembly has a vertically disposed tube. The tube has an upper end and a lower end. The tube has an exterior surface and a hollow interior. The exterior surface of the tube has an upper extent. The upper extent is formed with threads. The exterior surface of the tube has a lower extent. The lower extent is formed unthreaded. A support aperture is formed in the coupling. The upper extent of the tube extends through the support aperture. Threads are above the exterior of the coupling. Threads are below the interior of the coupling. An upper support nut is provided. The upper support nut is adjustably received on the threads of the upper extent of the tube above the support aperture. A lower support nut is adjustably received on the threads of the upper extent of the tube below the support aperture. A positioning nut is adjustably received on the threads of the upper extent of the tube below the lower support nut. The tube and nuts are fabricated of a rigid material. The rigid material is preferably a plastic such as polyvinyl chloride. A torus-shaped float is provided. The torus-shaped float has a flat lower surface. The flat lower surface is slidably received upon the lower extent of the tube. The float is fabricated of a buoyant material. In this manner the float may rise and fall as the float slides up and down on the tube in response to an increase and decrease of the water level within the coupling. A magnetic plate is provided in a washer shaped configuration. The magnetic plate has a flat upper surface. The flat upper surface is secured to the lower surface of the float for movement. A U-shaped ring is provided. The U-shaped ring is secured to the tube adjacent to the lower end of the tube. In this manner the movement of the float and washer downwardly is limited. The positioning nut limits the movement of the float and washer upwardly. A pair of internal wires is provided. The wires are located within the tube with free ends adjacent to the lower end of the tube. The wires extend along the length of the tube upwardly and out of the coupling. In this manner switching for controlling the level of water within the container is provided. A disk is provided. The disk is an electrical induction member. The disk is adapted to create an electrical flow within the wires when the float and magnetic plate rests on the ring with little or no fluid within the coupling. The disk is adapted to terminate an electrical flow within the wires when the float and magnetic plate rise above the ring with excess fluid within the coupling. In this manner a switch is activated and deactivated in response to water within the coupling.

Provided last is a bleeding port. The bleeding port extends through the coupling. The bleeding port is positioned above the centerline. The support aperture extends through the housing above the axis of the input portion. The support aperture receives the tube extending there through.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved electrical fluid activated switch which has all of the advantages of the prior art fluid level controllers of known designs and configurations and none of the disadvantages.

It is another object of the present invention to provide a new and improved electrical fluid activated switch which may be easily and efficiently manufactured and marketed.

It is further an object of the present invention to provide a new and improved electrical fluid activated switch which is of durable and reliable constructions.

An even further object of the present invention is to provide a new and improved electrical fluid activated switch which is susceptible of a low cost of manufacture with regard to both materials and labor, and which accordingly is then susceptible of low prices of sale to the consuming public, thereby making such improved electrical fluid activated switch economically available to the buying public.

Even still another object of the present invention is to provide an improved electrical fluid activated switch for allowing a user to safely and conveniently control a fluid level of a container.

Lastly, it is an object of the present invention to provide a new and improved electrical field activated switch system. A linear slip to slip coupling has an input portion and output portion with a common horizontal centerline. A fluid container has a threaded aperture. An adaptor has a threaded input end releasably coupled to the threaded aperture of the container. An unthreaded output end is coupled to the input portion. A nipple has an output end and an input end. The nipple is coupled to the output portion of the coupling. An end cap is coupled to the output end of the nipple. An induction switch subassembly is coupled to the coupling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
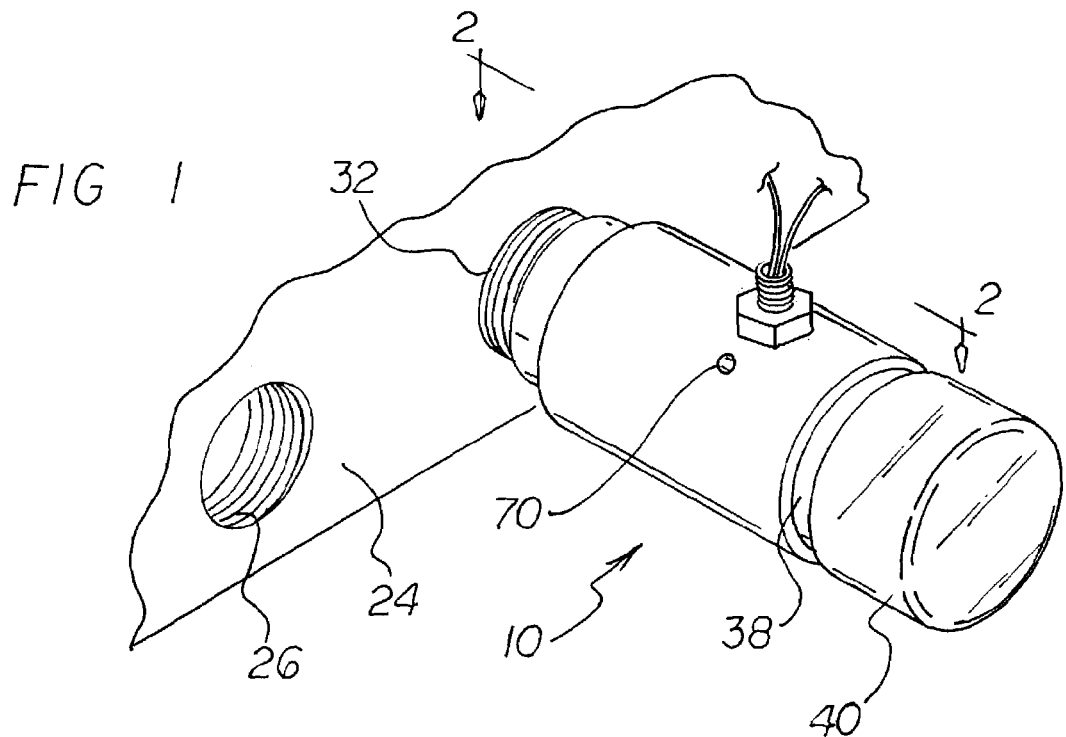
FIG. 1 is a perspective illustration of an electrical field activated switch system constructed in accordance with the principles of the present invention.
Figure 2:
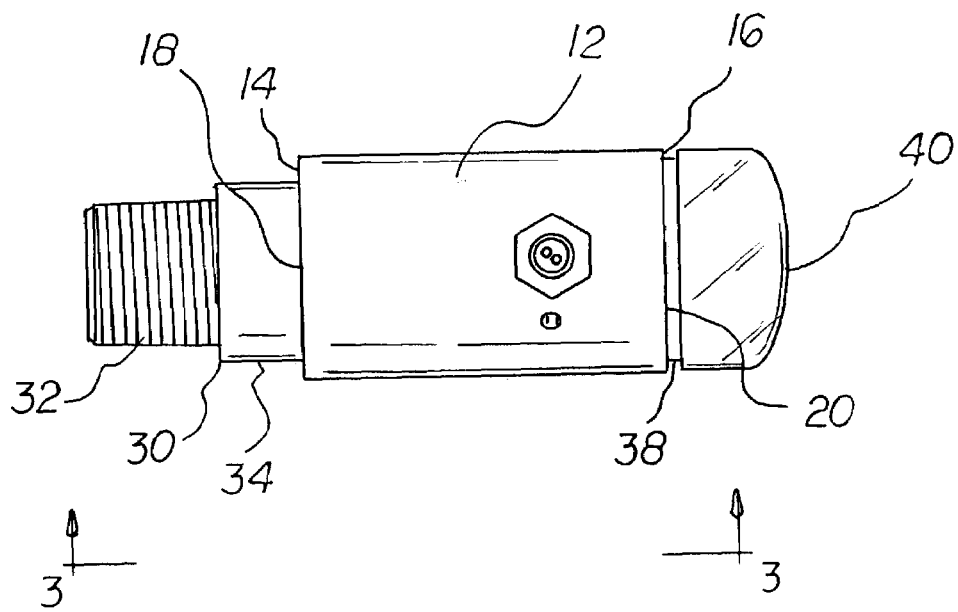
FIG. 2 is plan view of the invention taken along line 2—2 of FIG. 1.
Figure 3:
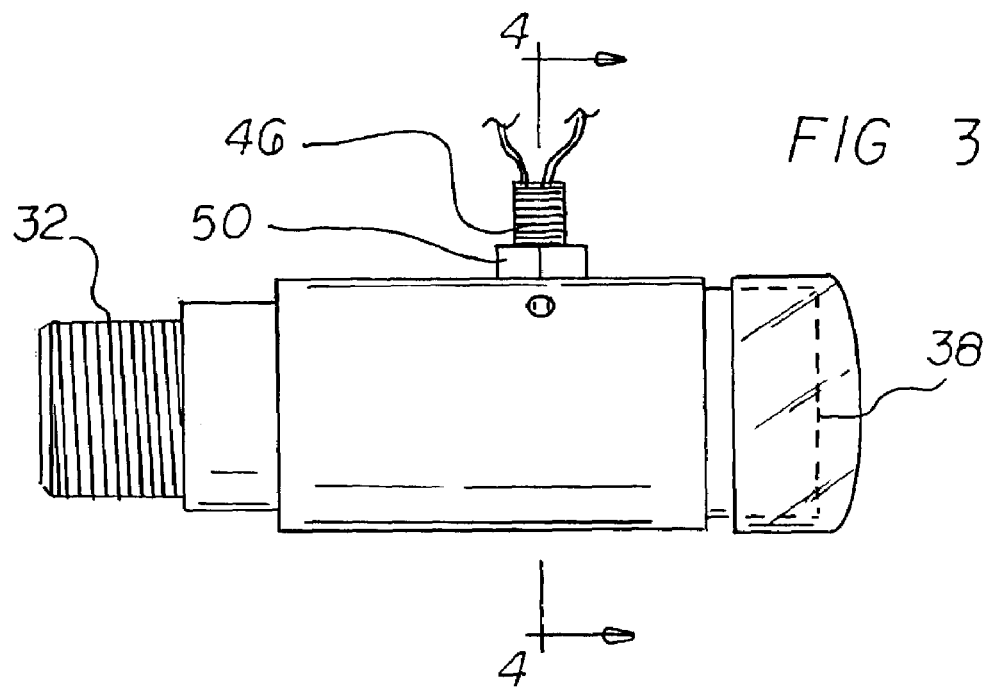
FIG. 3 is a front elevational view taken along line 3—3 of FIG. 2.
Figure 4:
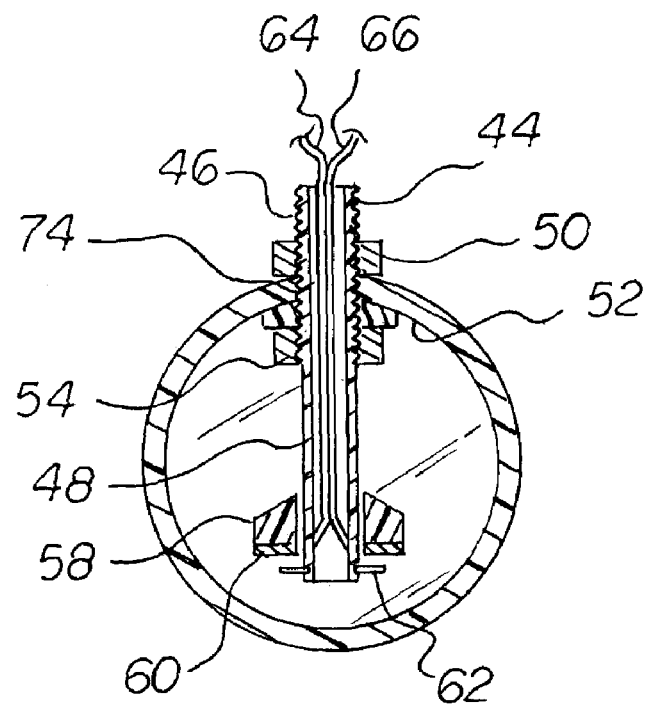
FIG. 4 is a cross sectional view taken along line 4—4 of FIG. 3.

With reference now to the drawings, and in particular to FIG. 1 thereof, the preferred embodiment of the new and improved electrical fluid activated switch embodying the principles and concepts of the present invention and generally designated by the reference numeral 10 will be described.

The present invention, the improved electrical fluid activated switch 10 is comprised of a plurality of components. Such components in their broadest context include a linear slip to slip coupling, a fluid container, an adaptor, a nipple, an end cap and an induction switch subassembly. Such components are individually configured and correlated with respect to each other so as to attain the desired objective.

First provided is a linear slip to slip coupling 12. The coupling is fabricated of rigid material. The rigid material is preferably a plastic such as polyvinyl chloride. The coupling has an input portion 14 and a output portion 16. The input portion has a round tubular configuration. The input portion has an input opening 18. The input portion has a horizontal central axis and a first diameter. The output portion has a round tubular configuration. The output portion has an output opening 20. The output portion has a horizontal central axis and a second diameter. The axis of the input portion and the axis of the output portion are coextensive. The axis of the input portion and the axis of the output portion are on a common horizontal centerline.

A fluid container 24 is provided. The fluid container has a vertical wall. The vertical wall holds fluid generated by an air conditioner. A threaded aperture 26 extends through the vertical wall.

A threaded male slip adaptor 30 is provided next. The slip adaptor is fabricated of rigid material. The rigid material is preferably a plastic such as polyvinyl chloride. The adaptor has a threaded input end 32. The input end is releasably coupled to the threaded aperture of the container. The adaptor has an unthreaded output end 34. The output end is coupled to the input opening of the coupling. In this manner fluid is allowed to flow into the coupling in the range of a desired fluid level.

A cylindrical unthreaded nipple 38 is provided. The nipple is fabricated of rigid material. The rigid material is preferably a plastic such as polyvinyl chloride. The nipple has an input end. The input end is coupled to the output opening of the coupling. The nipple has an output end.

An end cap 40 is also provided. The end cap is fabricated of a rigid transparent material. The rigid material is preferably a plastic such as polycarbonate or acrylic. The end cap is coupled to the output end of the nipple. The end cap seals the output portion of the coupling and the output end of the nipple. The transparent material allows the user to see the level of water therein which is the water level of the container.

Further provided is an induction switch subassembly. The subassembly has a vertically disposed tube 44. The tube has an upper end and a lower end. The tube has an exterior surface and a hollow interior. The exterior surface of the tube has an upper extent 46. The upper extent is formed with threads. The exterior surface of the tube has a lower extent 48. The lower extent is formed unthreaded. A support aperture 74 is formed in the coupling. The upper extent of the tube extends through the support aperture. Threads are above the exterior of the coupling. Threads are below the interior of the coupling. An upper support nut 50 is provided. The upper support nut is adjustably received on the threads of the upper extent of the tube above the support aperture. A lower support nut 52 is adjustably received on the threads of the upper extent of the tube below the support aperture. A positioning nut 54 is adjustably received on the threads of the upper extent of the tube below the lower support nut. The tube and nuts are fabricated of a rigid material. The rigid material is preferably a plastic such as polyvinyl chloride. A torus-shaped float 58 is provided. The torus-shaped float has a flat lower surface. The flat lower surface is slidably received upon the lower extent of the tube. The float is fabricated of a buoyant material. In this manner the float may rise and fall as the float slides up and down on the tube in response to an increase and decrease of the water level within the coupling. A magnetic plate 60 is provided in a washer shaped configuration. The magnetic plate has a flat upper surface. The flat upper surface is secured to the lower surface of the float for movement. A U-shaped ring 62 is provided. The U-shaped ring is secured to the tube adjacent to the lower end of the tube. In this manner the movement of the float and washer downwardly is limited. The positioning nut limits the movement of the float and washer upwardly. A pair of internal wires 64, 66 is provided. The wires are located within the tube with free ends adjacent to the lower end of the tube. The wires extend along the length of the tube upwardly and out of the coupling. In this manner switching for controlling the level of water within the container is provided. A disk is provided. The disk is an electrical induction member. The disk is adapted to create an electrical flow within the wires when the float and magnetic plate rests on the ring with little or no fluid within the coupling. The disk is adapted to terminate an electrical flow within the wires when the float and magnetic plate rise above the ring with excess fluid within the coupling. In this manner a switch is activated and deactivated in response to water within the coupling.

Provided last is a bleeding port 70. The bleeding port extends through the coupling. The bleeding port is positioned above the centerline. The support aperture 74 extends through the housing above the axis of the input and output portions. The support aperture receives the tube extending there through.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. An electrical field activated switch system for allowing a user to safely and conveniently control a fluid level of a container by utilizing an induction switch to control a fluid flow device comprising, in combination:

a linear slip to slip coupling fabricated of rigid material having an input portion and a output portion, the input portion having a round tubular configuration with an input opening, the input portion having a horizontal central axis and a first diameter, the output portion having a round tubular configuration with an output opening, the output portion having a horizontal central axis and a second diameter, the axis of the input portion and the axis of the output portion having in a common horizontal centerline;

a fluid container with a vertical wall for holding fluid generated by an air conditioner, the vertical wall having a threaded aperture extending there through;

a threaded male slip adaptor fabricated of rigid material, the adaptor having a threaded input end releasably coupled to the threaded aperture of the container, the adaptor having an unthreaded output end coupled to the input opening of the coupling for allowing fluid to flow into the coupling in the range of a desired fluid level;

a cylindrical unthreaded nipple fabricated of rigid material, the nipple having an input end coupled to the output opening of the coupling, the nipple having an output end;

an end cap fabricated of a rigid material coupled to the output end of the nipple to seal the output portion of the coupling and the output end of the nipple;

an induction switch subassembly having a vertically disposed tube, the tube having an upper end and a lower end with an exterior surface and a hollow interior, the exterior surface of the tube having an upper extent formed with threads, the exterior surface of the tube having a lower extent formed unthreaded, a support aperture formed in the coupling with the upper extent of the tube extending through the support aperture with threads above exterior of the coupling and threads below the interior of the coupling, an upper support nut adjustably received on the threads of the upper extent of the tube above the support aperture and a lower support nut adjustably received on the threads of the upper extent of the tube below the support aperture and a positioning nut adjustably received on the threads of the upper extent of the tube below the lower support nut, the tube and nuts being fabricated of a rigid material, a torus-shaped float with a flat lower surface slidably received upon the lower extent of the tube, the float being fabricated of a buoyant material to thereby rise and fall as the float slides up and down on the tube in response to an increase and decrease of the water level within the coupling, a magnetic plate in a washer shaped configuration and having a flat upper surface secured to the lower surface of the float for movement therewith and a U-shaped ring secured to the tube adjacent to the lower end of the tube to limit the movement of the float and washer downwardly while the positioning nut limits the movement of the float and washer upwardly, and a pair of internal wires located within the tube with free ends adjacent to the lower end of the tube, the wires extending along the length of the tube upwardly and out of the coupling for allowing the switching for controlling the level of water within the container, a disk being an electrical induction member adapted to create an electrical flow within the wires when the float and magnetic plate rests on the ring with little or no fluid within the coupling, the disk adapted to terminate an electrical flow within the wires when the float and magnetic plate rise above the ring with excess fluid within the coupling, thereby activating and inactivating a switch in response to water within the coupling; and a bleeding port extending through the coupling and positioned above the centerline with the support aperture extending through the housing above the axis of the input portion, the support aperture receiving the tube extending there through.

2. An electrical field activated switch system comprising:

a linear slip to slip coupling having an input portion and an output portion with a common horizontal centerline;

a fluid container with a threaded aperture;

an adaptor having a threaded input end releasably coupled to the threaded aperture of the container with an unthreaded output end coupled to the input portion;

a nipple having an output end and an input end coupled to the output portion of the coupling;

an end cap coupled to the output end of the nipple;

an induction switch subassembly coupled to the coupling, the induction switch subassembly includes a vertically disposed tube, the tube having an upper end and a lower end with an exterior surface and a hollow interior, the exterior surface of the tube having an upper extent formed with threads, the exterior surface of the tube having a lower extent formed unthreaded, a support aperture formed in the coupling with the upper extent of the tube extending through the support aperture with threads above exterior of the coupling and threads below interior of the coupling, an upper support nut adjustable received on the threads of the upper extent of the tube above the support aperture and a lower support nut adjustable received on the threads of the upper extent of the tube below the support aperture and a positioning nut adjustably received on the threads of the upper extent of the tube below the lower support nut, the tube and nuts being fabricated of a rigid material, a torus-shaped float with a flat lower surface slidably received upon the lower extent of the tube, the float being fabricated of a buoyant material to thereby rise and fall as the float slides up and down on the tube in response to an increase and decrease of the water level within the coupling, a magnetic plate in a washer shaped configuration and having a flat upper surface secured to the lower surface of the float for movement therewith and a U-shaped ring secured to the tube adjacent to the lower end of the tube to limit the movement of the float and washer downwardly while the positioning nut limits the movement of the float and washer upwardly, and a pair of internal wires located within the tube with free ends adjacent to the lower end of the tube, the wires extending along the length of the tube upwardly and out of the coupling for allowing the switching for controlling the level of water within the container, a disk being an electrical induction member adapted to create an electrical flow within the wires when the float and magnetic plate rests on the ring with little or no fluid within the coupling, the disk adapted to terminate an electrical flow within the wires when the float and magnetic plate rise above the ring with excess fluid within the coupling, thereby activating and inactivating a switch in response to water within the coupling; and a bleeding port extending through the coupling and positioned above the centerline and with the support aperture also extending through the housing above the centerline.

3. The system as set forth in claim 2 wherein the end cap is transparent.

* * * * *